Oct. 30, 1951  H. FORSSELL  2,573,255
MEANS FOR REPRODUCING A DIRECT CURRENT
Filed Dec. 24, 1947
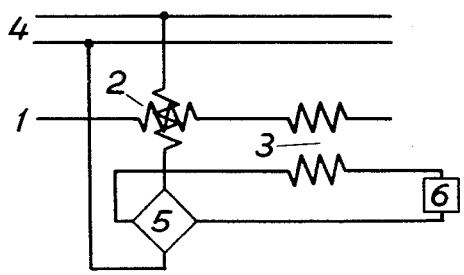
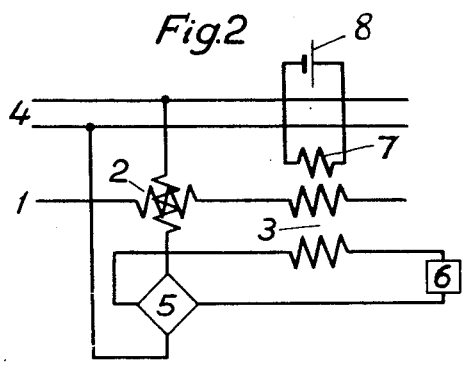
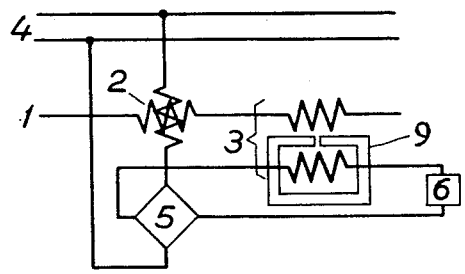
Inventor
Harry Forssell
By
Attorney.

Patented Oct. 30, 1951

2,573,255

UNITED STATES PATENT OFFICE 2,573,255

MEANS FOR REPRODUCING A DIRECT CURRENT

Harry Forssell, Herrgarden, Ludvika, Sweden, assignor to Allmänna Svenska Elektriska Aktiebolaget, Vasteras, Sweden, a Swedish corporation Application December 24, 1947, Serial No. 793,693
In Sweden June 16, 1942

Section 1, Public Law 690, August 8, 1946
Patent expires June 16, 1962

8 Claims. (Cl. 321—25)

In the U. S. patent application Serial Number 773,240 filed September 10, 1947 there is described an arrangement for an exact reproduction of a direct current by means of series-connected rectifiers fed through transductors. The present invention refers to another device for the same purpose, which as a rule is simpler than the aforesaid one. The invention utilizes the known connection, in which the direct current to be reproduced magnetizes a single transductor, the alternating current of which is rectified, and is characterized by the fact that the current thus rectified flows through the secondary winding of a current transformer, the primary winding of which is traversed by the current to be reproduced (the "main current"). The irregularities in the reproducing current which originate in the excitation and disexcitation of the transductor and in the commutation of the rectifier represent an alternating current superposed on the uniform direct current, but the formation of this alternating current is prevented by the inductive coupling with the main current, which as a rule is assumed to be a pure direct current. Any unbalance in the current transformer, i. e. any alternating current superposed on the direct current in one of the circuits, creates a voltage which opposes the unbalance by causing a corresponding current to flow in the reproducing circuit.

One form of the invention is diagrammatically illustrated at Fig. 1 in the accompanying drawing, and Figs. 2 and 3 are corresponding views showing two slightly modified forms.

Referring to Fig. 1, I is a direct current conductor, the current of which is to be reproduced, generally on a smaller scale. In the said conductor are connected in series a direct current winding of a transductor 2 and the primary winding of a current transformer 3. The alternating current winding of the transductor is connected to an alternating current network 4 in series with a rectifier 5. The direct current from the latter flows through the secondary winding of the current transformer 3 and through the load 6, for instance a measuring instrument, a regulator, or several similar apparatus.

In the ideal transductor, a uniform direct current gives an alternating current of rectangular shape, which when rectified in an ideal rectifier gives a uniform direct current, exactly proportional to the primary direct current. The proportionality refers also to the instantaneous values, so that incidental irregularities in the primary direct current are also reproduced in the secondary direct current created by the transductor and the rectifier. In practice, however, the transductor as well as the rectifier are imperfect and therefore cause irregularities in the secondary direct current curve even at a perfectly uniform primary direct current. These irregularities mainly occur about the instants when the alternating current changes its direction and may therefore be referred to as commutation notches.

The current transformer 3, if properly constructed, eliminates the major part of the aforesaid irregularities. Any unbalance between the primary and secondary direct current causes, in the current transformer, a change in the magnetisation and thereby a voltage which effects the equalisation. As regard especially the commutation notches, a closer investigation has shown that it may sometimes be advisable to take special steps for placing the corresponding flux variation on an appropriate portion of the magnetisation curve of the current transformer.

An analysis of the operation of the transductor shows, as known, that the commutation notches in its current curve occur during the time intervals when one of the transductor cores is saturated. If now the current transformer were of identical construction with the transductor as regards core and winding, its core, which is also magnetized by the difference between the primary direct current and the transductor current (which is here rectified), would be saturated at the same instant as one of the transductor cores, i. e. already when the real commutation notch begins, and therefore it would be difficult for it to furnish the voltage wave necessary to fill out the commutation notch.

For preventing the aforesaid saturation beforehand of the current transformer, steps of different nature may be taken. For instance, a certain unbalance may be created between the ampereturns of the current transformer at normal current load so as to make the core more or less saturated in the opposite sense against that in which the commutation notch is likely to saturate it. An unbalance of the first-named kind may be created for instance by an additional winding on the current transformer, on the transductor, or on both, said winding being fed by a constant source of direct current voltage and acting in the same sense as the secondary winding of the current transformer or as the direct current winding of the transductor. Another means for the same purpose would be to make the proportion between the secondary and primary winding turns of the current transformer somewhat larger than the proportion between the alternating and direct current winding turns of the transductor. Respect should then be paid also to current losses in the rectifier, which may cause some increase of the number of secondary winding turns.

Fig. 2 shows an arrangement similar to Fig. 1, but including an additional winding 7 for the rectifier 3, said winding 7 being connected to a source 8 of constant direct current.

Another way of preventing a too early saturation of the core of the current transformer is to construct this core so that it will require a larger number of ampereturns to reach saturation than the transductor core. For this purpose, the current transformer core may for instance be provided with a small air gap or be built up of a material having a lower maximum permeability than the transductor core, for instance of ordinary transformer iron while the transductor core consists of a material of high permeability, for instance so-called mu-metal.

Fig. 3 shows an arrangement similar to Fig. 1, but having the transformer core 9 of the transformer 3 formed with an airgap.

The means proposed for preventing a too early saturation of the current transformer core could also be combined in different ways.

I claim as my invention:

1. Means for reproducing a direct current, comprising a transductor having a winding adapted to be traversed by said current and a winding adapted to be fed by an alternating current source, a rectifier in series with said alternating current winding, and a current transformer having a primary winding connected in series with said direct current traversed winding and a secondary winding connected in series with direct current terminals of said rectifier.

2. Means for reproducing a direct current, comprising a transductor having a winding adapted to be traversed by said current and a winding adapted to be fed by an alternating current source, a rectifier in series with said alternating current winding, a current transformer having a primary winding connected in series with said direct current traversed winding and a secondary winding connected in series with direct current terminals of said rectifier, and means for creating an unbalance between primary and secondary ampereturns of said current transformer at normal current load.

3. Means for reproducing a direct current, comprising a transductor having a winding adapted to be traversed by said current and a winding adapted to be fed by an alternating current source, a rectifier in series with said alternating current winding, and a current transformer having a primary winding connected in series with said direct current traversed winding, a secondary winding connected in series with direct current terminals of said rectifier, and an additional winding connected to a source of constant direct current.

4. Means for reproducing a direct current, comprising a transductor having one winding adapted to be traversed by said current, one winding adapted to be fed by a constant direct current cooperating with the said current, and one winding adapted to be fed by an alternating current source, a rectifier in series with said alternating current winding, and a current transformer having a primary winding connected in series with said first-named direct current traversed winding and a secondary winding connected in series with direct current terminals of said rectifier.

5. Means for reproducing a direct current, comprising a transductor having a winding adapted to be traversed by said current and a winding adapted to be fed by an alternating current source, the numbers of turns of said windings having a certain proportion to each other, a rectifier in series with said alternating current winding, and a current transformer having a primary winding connected in series with said direct current traversed winding and a secondary winding connected in series with direct current terminals of said rectifier, the proportion between the numbers of turns of the secondary and primary windings of said current transformer being somewhat larger than the proportion between numbers of turns of the alternating current winding and of the direct current winding of said transductor.

6. Means for reproducing a direct current, comprising a transductor having a winding adapted to be traversed by said current, a winding adapted to be fed by an alternating current source, and a core adapted to be saturated by a certain number of ampereturns, a rectifier in series with said alternating current winding, and a current transformer having a primary winding connected in series with said direct current traversed winding, a secondary winding connected in series with direct current terminals of said rectifier, and a core adapted to be saturated by a higher number of ampereturns than the core of said transductor.

7. Means according to claim 6, in which the core of said current transformer has an airgap.

8. Means for reproducing a direct current, comprising a transductor having a winding adapted to be traversed by said current, a winding adapted to be fed by an alternating current source, and a core having a certain maximum permeability, a rectifier in series with said alternating current winding, and a current transformer having a primary winding connected in series with said direct current traversed winding, a secondary winding connected in series with direct current terminals of said rectifier, and a core having a lower maximum permeability than the core of said transductor.

HARRY FORSSELL.

REFERENCES CITED

The following references are of record in the file of this patent:

UNITED STATES PATENTS

| Number | Name | Date |
| --- | --- | --- |
| 1,739,579 | Dowling | Dec. 17, 1929 |
| 1,968,576 | Suits | July 31, 1934 |
| 2,129,738 | Karolus | Sept. 13, 1938 |
| 2,164,383 | Burton | July 4, 1939 |
| 2,337,253 | Lamm | Dec. 21, 1943 |
| 2,429,827 | Lamm | Oct. 28, 1947 |

FOREIGN PATENTS

| Number | Country | Date |
| --- | --- | --- |
| 554,525 | Great Britain | July 7, 1943 |
| 573,793 | Great Britain | Dec. 6, 1945 |